United States Patent
Rissanen

(10) Patent No.: US 10,192,232 B2
(45) Date of Patent: *Jan. 29, 2019

(54) WIRELESS ELECTRONIC COUPONING TECHNIQUE

(71) Applicant: Nokia Technologies Oy, Espoo (FI)

(72) Inventor: Jussi Rissanen, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 15/339,499

(22) Filed: Oct. 31, 2016

(65) Prior Publication Data
US 2017/0046730 A1 Feb. 16, 2017

Related U.S. Application Data

(63) Continuation of application No. 14/584,527, filed on Dec. 29, 2014, now Pat. No. 9,483,776, which is a
(Continued)

(51) Int. Cl.
*H04B 7/00* (2006.01)
*G06Q 30/02* (2012.01)
(Continued)

(52) U.S. Cl.
CPC ....... *G06Q 30/0222* (2013.01); *G06Q 20/327* (2013.01); *G06Q 30/02* (2013.01);
(Continued)

(58) Field of Classification Search
CPC ........... G06Q 30/0267; G06Q 30/0238; G06Q 30/0239; G06Q 30/0268; G06Q 20/325
(Continued)

(56) References Cited

U.S. PATENT DOCUMENTS

| 4,825,045 A | 4/1989 | Humble |
|---|---|---|
| 4,908,761 A | 3/1990 | Tai |

(Continued)

FOREIGN PATENT DOCUMENTS

| EP | 0950968 A1 | 10/1999 |
|---|---|---|
| WO | 9721200 A2 | 6/1997 |

OTHER PUBLICATIONS

Office Action for related U.S. Appl. No. 11/934,440, dated Aug. 16, 2010, pp. 1-11.
(Continued)

*Primary Examiner* — Tu X Nguyen
(74) *Attorney, Agent, or Firm* — Ditthavong & Steiner, P.C.

(57) ABSTRACT

An electronic couponing technique includes transferring coupon information, which may include a coupon ID (identification) to a first portable terminal and storing same therein. The portable terminal displays a representation of the transferred coupon information on a display thereof. The stored coupon information may be transferred from the portable terminal to another terminal for redemption. The stored coupon information may also be transferred from the portable terminal to another portable terminal. Various schemes may be used to transfer the coupon information including a Bluetooth low-range radio link or an optical bar code scanner scanning an optical bar code or an infrared link or a wireless link from the portable terminal. The Internet or wireless LAN (Local Area Network) may also be used in transferring the coupon information to and from the various terminals.

20 Claims, 14 Drawing Sheets

Related U.S. Application Data continuation of application No. 13/307,462, filed on Nov. 30, 2011, now Pat. No. 8,923,766, which is a continuation of application No. 12/947,102, filed on Nov. 16, 2010, now Pat. No. 8,090,355, which is a continuation of application No. 11/934,440, filed on Nov. 2, 2007, now Pat. No. 7,860,450, which is a continuation of application No. 09/461,353, filed on Dec. 15, 1999, now Pat. No. 7,308,254.

(51) Int. Cl.
*G06Q 20/32* (2012.01)
*G07G 1/00* (2006.01)

(52) U.S. Cl.
CPC ..... *G06Q 30/0207* (2013.01); *G06Q 30/0211* (2013.01); *G06Q 30/0225* (2013.01); *G06Q 30/0236* (2013.01); *G06Q 30/0238* (2013.01); *G06Q 30/0239* (2013.01); *G06Q 30/0267* (2013.01); *G06Q 30/0277* (2013.01); *G07G 1/0036* (2013.01)

(58) Field of Classification Search
USPC ........................................ 455/3.06; 705/14.1
See application file for complete search history.

(56) References Cited

U.S. PATENT DOCUMENTS

| | | |
|---|---|---|
| 4,910,672 A | 3/1990 | Off et al. |
| 4,996,642 A | 2/1991 | Hey |
| 5,053,957 A | 10/1991 | Suzuki |
| 5,056,019 A | 10/1991 | Schultz et al. |
| 5,173,851 A | 12/1992 | Off et al. |
| 5,201,010 A | 4/1993 | Deaton et al. |
| 5,327,508 A | 7/1994 | Deaton et al. |
| 5,353,218 A | 10/1994 | De Lapa et al. |
| 5,353,219 A | 10/1994 | Mueller et al. |
| 5,420,606 A | 5/1995 | Begum et al. |
| 5,481,094 A | 1/1996 | Suda |
| 5,502,636 A | 3/1996 | Clarke |
| 5,504,675 A | 4/1996 | Cragun et al. |
| 5,523,794 A | 6/1996 | Mankovitz et al. |
| 5,576,951 A | 11/1996 | Lockwood |
| 5,583,763 A | 12/1996 | Atcheson et al. |
| 5,592,560 A | 1/1997 | Deaton et al. |
| 5,612,868 A | 3/1997 | Off et al. |
| 5,615,342 A | 3/1997 | Johnson |
| 5,621,812 A | 4/1997 | Deaton et al. |
| 5,625,776 A | 4/1997 | Johnson |
| 5,638,457 A | 6/1997 | Deaton et al. |
| 5,649,114 A | 7/1997 | Deaton et al. |
| 5,657,317 A | 8/1997 | Mahany et al. |
| 5,665,953 A | 9/1997 | Mazzamuto et al. |
| 5,710,886 A | 1/1998 | Christensen et al. |
| 5,710,887 A | 1/1998 | Chelliah et al. |
| 5,715,399 A | 2/1998 | Bezos |
| 5,727,153 A | 3/1998 | Powell |
| 5,761,648 A | 6/1998 | Golden et al. |
| 5,789,732 A | 8/1998 | McMahon et al. |
| 5,812,937 A | 9/1998 | Takahisa et al. |
| 5,832,457 A | 11/1998 | O'Brien et al. |
| 5,870,030 A | 2/1999 | Deluca et al. |
| 5,907,830 A | 5/1999 | Engel et al. |
| 5,979,757 A | 11/1999 | Tracy et al. |
| 6,009,411 A | 12/1999 | Kepecs |
| 6,026,370 A | 2/2000 | Jermyn |
| 6,036,086 A | 3/2000 | Sizer, II et al. |
| 6,055,513 A | 4/2000 | Katz et al. |
| 6,055,573 A | 4/2000 | Gardenswartz et al. |
| 6,067,524 A | 5/2000 | Byerly et al. |
| 6,076,068 A | 6/2000 | Delapa et al. |
| 6,112,981 A | 9/2000 | McCall |
| 6,118,784 A | 9/2000 | Tsuchiya et al. |
| 6,123,259 A | 9/2000 | Ogasawara |
| 6,160,994 A | 12/2000 | Wiedeman |
| 6,311,171 B1 | 10/2001 | Dent |
| 6,327,300 B1 | 12/2001 | Souissi et al. |
| 6,336,099 B1 * | 1/2002 | Barnett ............... G06Q 20/108 705/14.35 |
| 6,385,591 B1 | 5/2002 | Mankoff |
| 6,505,773 B1 | 1/2003 | Palmer et al. |
| 6,628,729 B1 * | 9/2003 | Sorensen ............. H04N 5/4401 348/734 |
| 7,069,228 B1 | 6/2006 | Rose et al. |
| 7,240,021 B1 | 7/2007 | Walker et al. |
| 7,308,254 B1 | 12/2007 | Rissanen |
| 2002/0007306 A1 | 1/2002 | Granger et al. |
| 2002/0128903 A1 | 9/2002 | Kernahan et al. |
| 2008/0097855 A1 | 4/2008 | Rissanen et al. |

OTHER PUBLICATIONS

Office Action for related U.S. Appl. No. 11/934,440, dated Jun. 24, 2010, pp. 1-7.

Office Action for related U.S. Appl. No. 11/934,440, dated Aug. 17, 2009, pp. 1-7.

Office Action for related U.S. Appl. No. 11/934,440, dated Mar. 17, 2009, pp. 1-7.

Office Action for related U.S. Appl. No. 09/461,353, dated Jul. 19, 2005, pp. 1-8.

Office Action for related U.S. Appl. No. 09/461,353, dated May 9, 2005, pp. 1-19.

Office Action for related U.S. Appl. No. 09/461,353, dated Apr. 5, 2004, pp. 1-7.

Office Action for related U.S. Appl. No. 09/461,353, dated Dec. 8, 2003, pp. 1-7.

Office Action for related U.S. Appl. No. 09/461,353, dated Nov. 19, 2002, pp. 1-9.

Office Action for related U.S. Appl. No. 09/461,353, dated Mar. 1, 2002, pp. 1-12.

Office Action for related U.S. Appl. No. 09/461,353, dated Nov. 22, 2004, pp. 1-11.

Office Action for related U.S. Appl. No. 11/934,440, dated Oct. 20, 2009, pp. 1-8.

Office Action for corresponding European Patent Application No. 00 981 528.3-2221, dated Feb. 26, 2004, 7 pages.

* cited by examiner

WIRELESS ELECTRONIC COUPONING TECHNIQUE

CROSS-REFERENCE TO RELATED APPLICATIONS

This application is a continuation of U.S. patent application Ser. No. 14/584,527, filed Dec. 29, 2014, entitled "Wireless Electronic Couponing Technique", which is a continuation of U.S. patent application Ser. No. 13/307,462, filed Nov. 30, 2011, entitled "Wireless Electronic Couponing Technique", which is a continuation of U.S. patent application Ser. No. 12/947,102 filed on Nov. 16, 2010, entitled "Wireless Electronic Couponing Technique", which is a continuation of U.S. patent application Ser. No. 11/934,440, dated Nov. 2, 2007, entitled "Wireless Electronic Couponing Technique", which is a continuation of U.S. patent application Ser. No. 09/461,353, filed Dec. 15, 1999 entitled "Wireless Electronic Couponing Technique", which are each hereby incorporated by reference herein in their entireties.

BACKGROUND OP THE INVENTION

Field of the Invention

The present invention relates to the field of telecommunications/mobile terminals. More particularly, the present invention relates to a mobile terminal capable of downloading, or scanning, or collecting, and viewing, or transmitting, and using coupons.

Description of the Related Art

There has been a problem of how to handle transactions including coupons in retail stores. Coupons in a paper format require manual operation by the cashier at the retail store, taking up valuable customer service time, thus increasing the length of checkout lines, resulting in need of more personnel and thus expenses. Also the logistics involved in further mailing the paper coupons to respective manufacturers for validation and related cash reimbursements to retail stores tie up significant amounts of effort and workload.

Also, at the customer end, there is the problem of how to keep track of, store, find and use the right coupons when visiting retail stores when buying the goods in question. Usually the coupon usage operation by the consumer has been as follows (an example):

A consumer reads a newspaper and finds a coupon insert. The consumer enters a retail store and collects the goods to be purchased. At the checkout counter, the goods are read by a bar code scanner. The consumer gives the cashier the coupons that are valid and the cashier enters the discount, either by bar code scanner or manually. The consumer thus receives a discount on the specific products mentioned in the coupons.

After that, the retail store gathers all the coupons, sorts them out and send them to their respective manufacturers who then credit the retail store's account on respective sums of the discount (in the case of manufacturer reimbursed coupons).

On the larger view there is a rising problem and challenge of how to bring meaningful and acceptable marketing communication, direct marketing, direct response marketing and advertising messages to new wireless mobile terminals that are emerging. These wireless terminals include mobile phones, personal digital assistants (PDAs) with network connectivity, smart phones and other wireless internet appliances. The wireless couponing system, methodology and apparatus is a new method of providing advertisers and marketers access to their target audiences using wireless terminals.

Presently, there are two types of Internet coupons in use in retail sales.

In one type of Internet coupon arrangement, Internet coupons are downloaded from the Internet by a user and printed on the user's printer. This eliminates the coupon distribution problem from the manufacturer or retail store to the user but does not eliminate the use of paper coupons from the user to the retail store and optionally to the manufacturer.

Another type of Internet coupon arrangement allows the downloading of coupons from the Internet to a smart card of the user. The use of smart cards having coupons stored therein requires special hardware and the coupons stored in the smart card are not easily viewed by the user while in a retail store.

SUMMARY OF THE INVENTION

In carrying out one technique of the present invention, there is a system of infrastructure comprising and supporting wireless coupons that may be downloaded, viewed, credited (used) in electronic format throughout their distribution life cycle. The coupons are stored, carried and used in a wireless mobile terminal such as a mobile phone. The electronic coupons may be delivered to the terminal by methods including: they may be downloaded to the terminal from the Internet; they may be pushed to the terminal by e-mail-type messages; they may be downloaded to the terminal by a short-range radio link such as Bluetooth or they may be scanned from a printed paper by using a (built in or external) scanner in a mobile terminal, or via an infrared link or by other methods. They may also be downloaded from a wireless LAN connection.

An important distinction from previous Internet coupons and print coupons is the fact that the coupon files are stored in the memory of the mobile terminal, or a coupon ID number string is stored in the mobile terminal and the visual representation may be downloaded separately from a network server as needed or when excess bandwidth capacity exists. Thus, the coupon files are easily carried by the consumer at all times, and are readily available as the need rises (like when visiting a retail store, a restaurant, gas station, etc.). During a visit to a retail outlet, the consumer takes out his/her mobile terminal, initiates a coupon match sequence that compares the coupon files stored in the terminal with the promotions effective at the retail outlet. If a match is found, i.e., the consumer carries an electronic coupon that justifies a discount, the point of sale (POS) terminal calculates a discount to the prices of the goods to be purchased, or grants other specified benefits to the coupon bearer. The mobile terminal and the POS terminal may exchange the electronic coupon information in the following ways: a wireless digital short-range radio link such as Bluetooth, via an infrared data link, or via bar code scanning by the POS terminal from the mobile terminal display.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration in example only and the invention is not limited thereto. The spirit and scope of the present invention are limited only by the terms of the appended claims.

DETAILED DESCRIPTION

Figure 1:
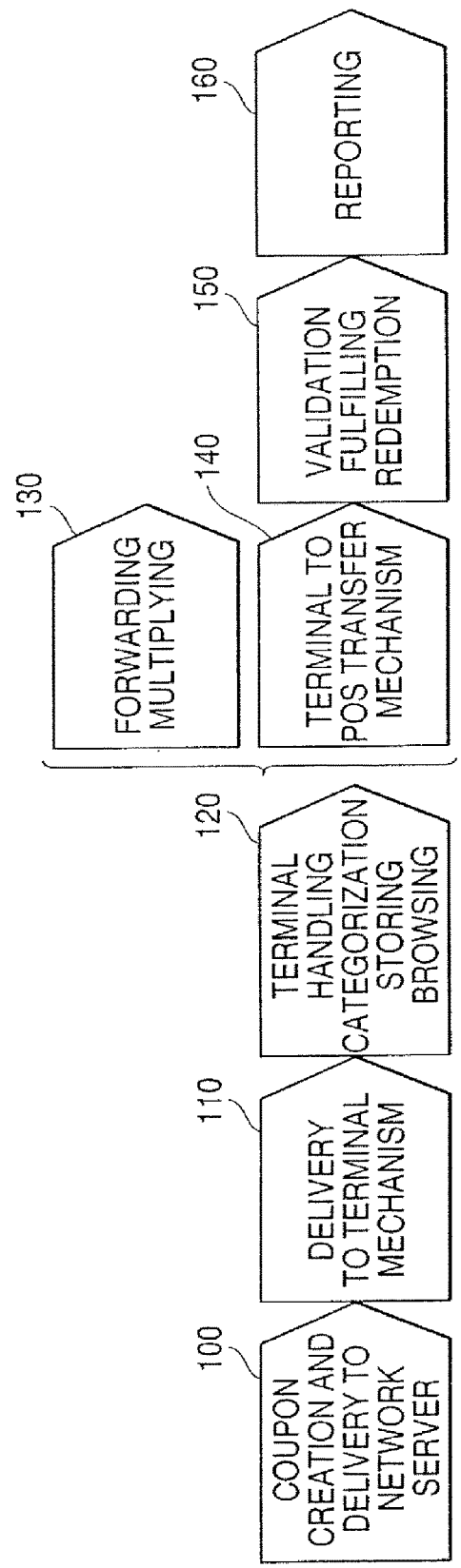
FIG. 1 is a flowchart of a couponing system in accordance with the present invention.

FIG. 1 is a flowchart of a couponing system in accordance with the present invention.

In Step 100, a coupon is created and delivered to a network server. The various attributes of the coupon are inputted to the server by either a manufacturer of the product or products mentioned in the coupon or are inputted to the server from the offices of a retailer store. In both cases, the purpose of providing discount coupons is to increase sales by providing the user with an additional incentive to purchase the product or products mentioned in the coupon. In the case of coupons being offered by a retailer, the incentive offered by the coupon increases the volume of traffic of potential buyers which usually results in increased sales.

In Step 110, the coupon is electronically delivered to the wireless terminal using one of several optional methods which will be discussed later.

In Step 120, the terminal processes the electronically transmitted coupon by handling, categorizing, storing, and enabling browsing by the user.

Figure 2:
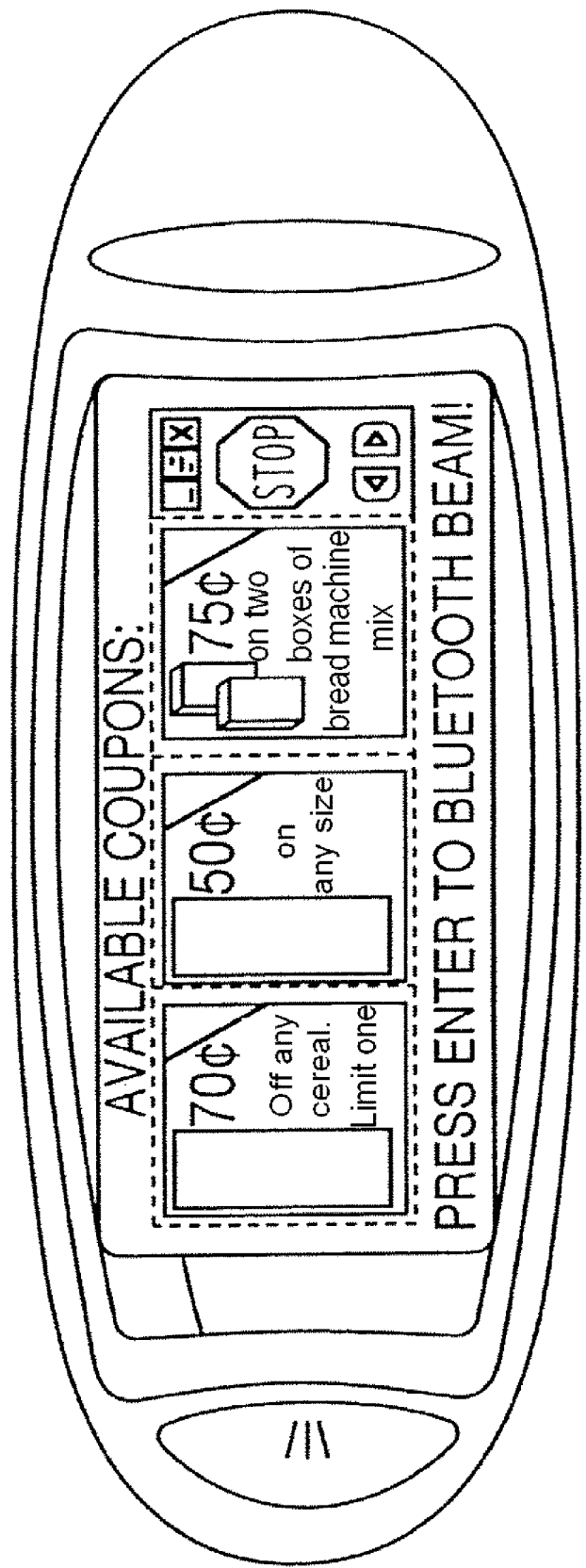
FIG. 2 illustrates one possible implementation of coupon browsing on a wireless terminal.

FIG. 2 illustrates one possible implementation of coupon browsing on a display of a wireless terminal.

This is but one possible example of the wireless terminal display during coupon browsing. It is, of course, understood that other possibilities exist depending on the capability of the wireless terminal.

Returning to FIG. 1, in Step 130, the wireless terminal contains an additional feature not available with paper coupons, namely, the ability to forward the electronically transmitted coupon to another wireless terminal or to in effect multiply the electronically transmitted coupon by forwarding it to several other wireless terminals. This allows for the wider distribution of the electronically transmitted coupon at no additional cost to the manufacturer or retailer issuing the coupon and is analogous to word-of-mouth advertising. Word-of-mouth advertising is a very powerful advertising tool in that a satisfied customer disseminates information about a product to other potential customers who value the opinion of the satisfied customer.

In Step 140, the user of the billable terminal can transfer the electronically transmitted coupon to the point-of-sale terminal of the retailer via one of several different methods which will be discussed in detail later.

In Step 150, the point-of-sale terminal validates the electronically transmitted coupon and electronically redeems it by providing an immediate discount to the customer in accordance with the requirements of the coupon.

In Step 160, the point-of-sale terminal reports the redemption of the coupon to the issuer of the coupon such as the manufacturer in the case of manufacturer coupons and to the retailer's office in the case of retailer coupons.

Figure 3:
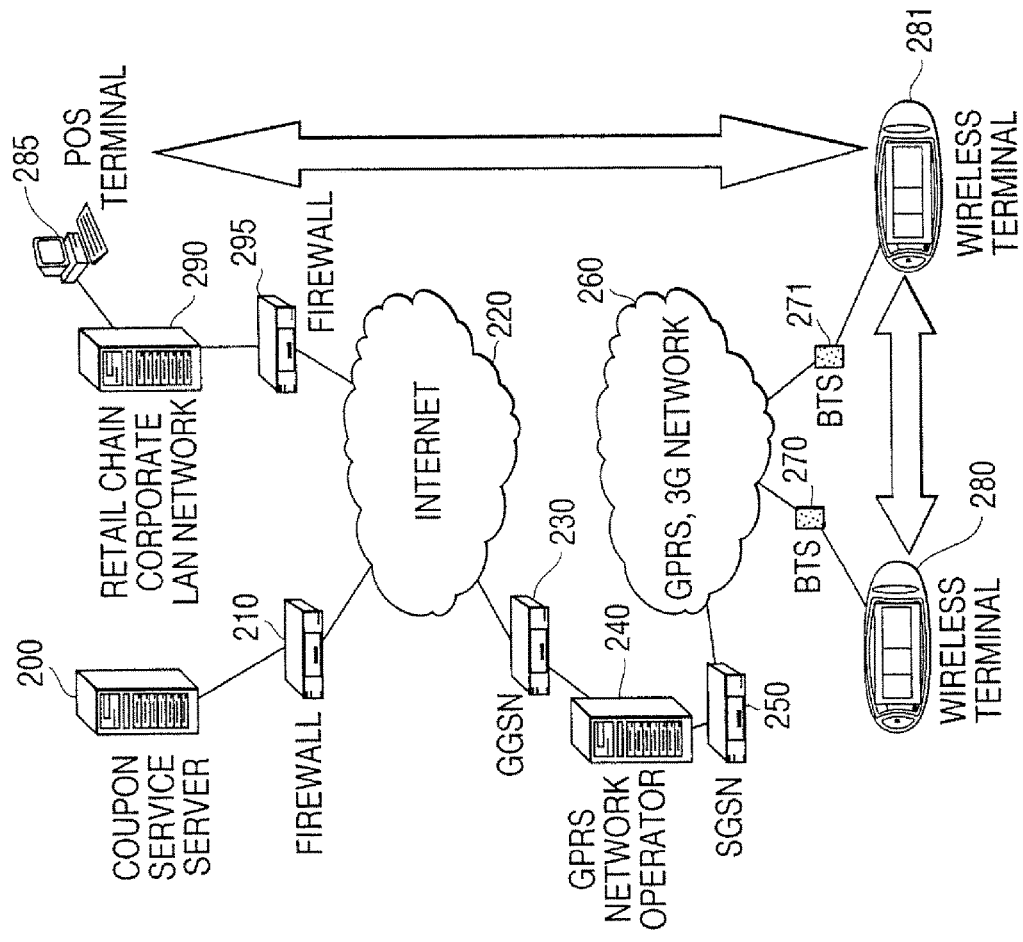
FIG. 3 illustrates the general architecture of the wireless couponing technique of the present invention.

FIG. 3 illustrates the general architecture of the wireless couponing technique of the present invention.

The coupon service server 200 receives and stores the attributes of the various coupons to be disseminated to the wireless terminals.

A coupon would include the discount/benefit information (e.g. which specific product, and which product family and in what combination, etc.), the forwardability and multiplyability information (that is, whether the electronic coupon could be forwarded to one or more other wireless terminals), the validity time period, the usage time period (e.g., during office hours, etc.). The textual and visual/audio representation of the coupon may be forwarded together or separately from the coupon service server, the coupons being identified by their coupon ID number.

In order to efficiently handle, classify, and store coupons, various metadata in a standardized format of the coupon is provided. One standardized format for the metadata could be XML (extended mark-up language).

Returning to FIG. 3, the coupon service server 200 transmits the coupon data through a firewall 210 to the Internet 220. The Internet 220 forward the data to a GGSN (gateway GPRS (general packet radio service) support node) 230 which in turn transmits the data to a GPRS network operator 240.

The GPRS network operator 240 transmits the coupon data to an SGSN (serving GPRS support node) 250 which transmits the data via GPRS or 3G (third generation wireless communication) network 260, for example.

The network 260 transmits the data to wireless terminals 280 and 281 via BTS (base transceiver station) 270 and 271, respectively.

Alternatively, the coupon data can be transmitted only to wireless terminal 280 and then transmitted via various means which will be discussed subsequently to wireless terminal 281.

When the user of wireless terminal 281 wishes to redeem his or her electronic coupon at a retailer, the electronic coupon stored in his or her wireless terminal 281 is electronically transferred to the point-of-sale terminal 285 by various methods which will be discussed in detail later.

The redemption information contained in the point of-sale terminal 285 is subsequently transferred to the retail chain corporate LAN (local area network) network 290 which compiles the coupon redemption information from all of its point-of-sale terminals and forwards this information to the coupon service server 200 via the firewall 295, Internet 220 and firewall 210.

Figure 4:
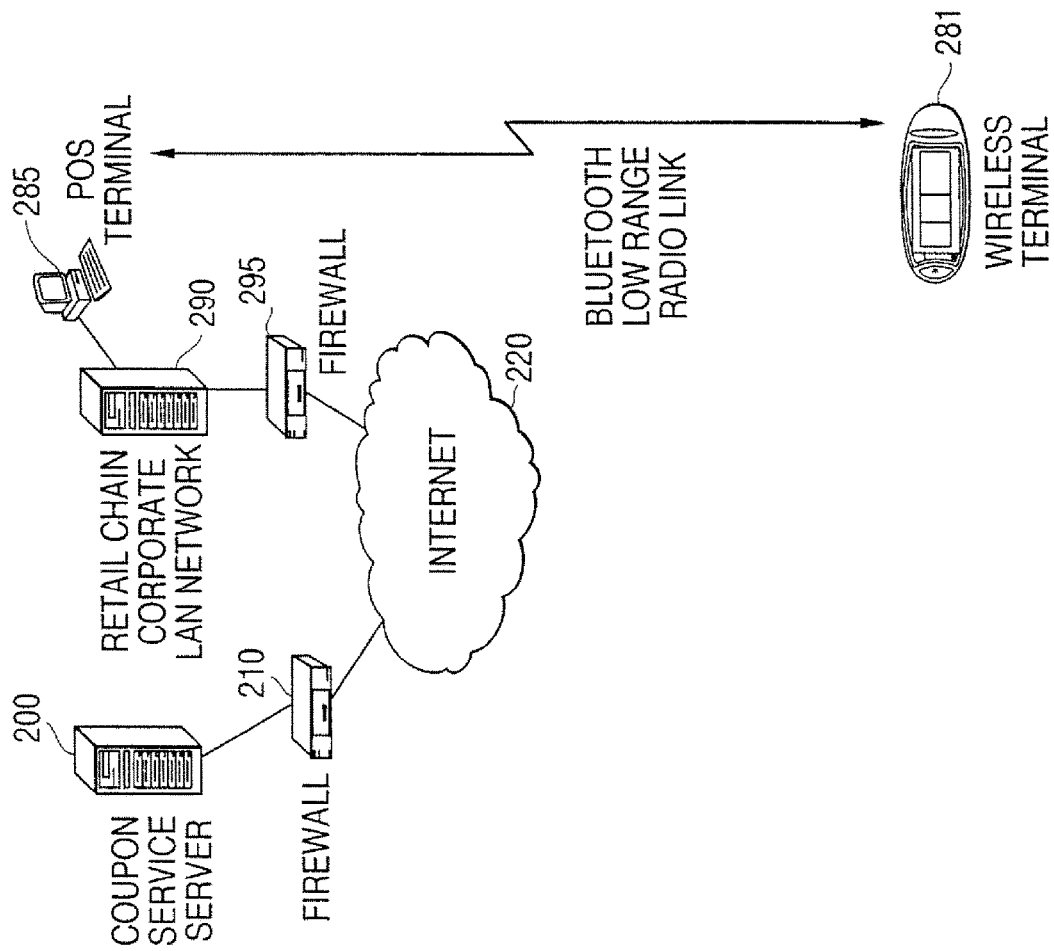
FIG. 4 illustrates the data flow from a wireless terminal to a point of sale terminal via Bluetooth.

FIG. 4 illustrates the data flow between a point-of sale terminal and a wireless terminal via Bluetooth.

The following is a technology overview of the Bluetooth system.

The technology is an open specification for wireless communication of data and voice. It is based on a low-cost short-range radio link, built into a 9×9 mm microchip, facilitating protected ad hoc connections for stationary and mobile communication environments. Bluetooth technology allows for the replacement of the many proprietary cables that connect one device to another with one universal short-range radio link. For instance, Bluetooth radio technology built into both the cellular telephone and the laptop would replace the cumbersome cable used today to connect a laptop to a cellular telephone. Printers, PDA's, desktops, fax machines, keyboards, joysticks and virtually any other digital device can be part of the Bluetooth system. But beyond untethering devices by replacing the cables, Bluetooth radio technology provides a universal bridge to existing data networks, a peripheral interface, and a mechanism to form small private ad hoc groupings of connected devices away from fixed network infrastructures. Designed to operate in a noisy radio frequency environment, the Bluetooth radio uses a fast acknowledgment and frequency hopping scheme to make the link robust. Bluetooth radio modules avoid interference from other signals by hopping to a new frequency after transmitting or receiving a packet. Compared with other systems operating in the same frequency band, the Bluetooth radio typically hops faster and uses shorter packets. This makes the Bluetooth radio more robust than other systems. Short packages and fast hopping also limit the impact of domestic and professional microwave ovens. Use of Forward Error Correction (FEC) limits the impact of random noise on long-distance links. The encoding is optimized for an uncoordinated environment. Bluetooth radios operate in the unlicensed ISM band at 2.4 GHZ. A frequency hop transceiver is applied to combat interference and fading. A shaped, binary FM modulation is applied to minimize transceiver complexity. The gross data rate is 1 Mb/s. A Time-Division Duplex scheme is used for full-duplex transmission. The Bluetooth baseband protocol is a combination of circuit and packet switching. Slots can be reserved for synchronous packets. Each packet is transmitted in a different hop frequency. A packet nominally covers a single slot, but can be extended to cover up to five slots. Bluetooth can support an asynchronous data channel, up to three simultaneous synchronous voice channels, or a channel which simultaneously supports asynchronous data and synchronous voice. Each voice channels supports 64 kb/s synchronous (voice) link. The asynchronous channel can support an asymmetric link of maximally 721 Kb/s in either direction while permitting 57.6 Kb/s in the return direction, or a 432.6 Kb/s symmetric link.

While Bluetooth has been discussed in detail above with regard to the present invention, it is to be understood that this is just for explanatory purposes.

The present invention is not limited to the Bluetooth implementation.

In operation, the wireless terminal 281 transmits the coupon ID and information to the point-of-sale terminal 285. The retail chain corporate LAN network 290, connected to the coupon service server 200 via the firewall 210, Internet 220, and firewall 295, verifies the coupon and calculates the discount/benefit in real time or as a batch daily. The coupon information is updated to the coupon service server as well as to the retail chain network server.

Figure 5:
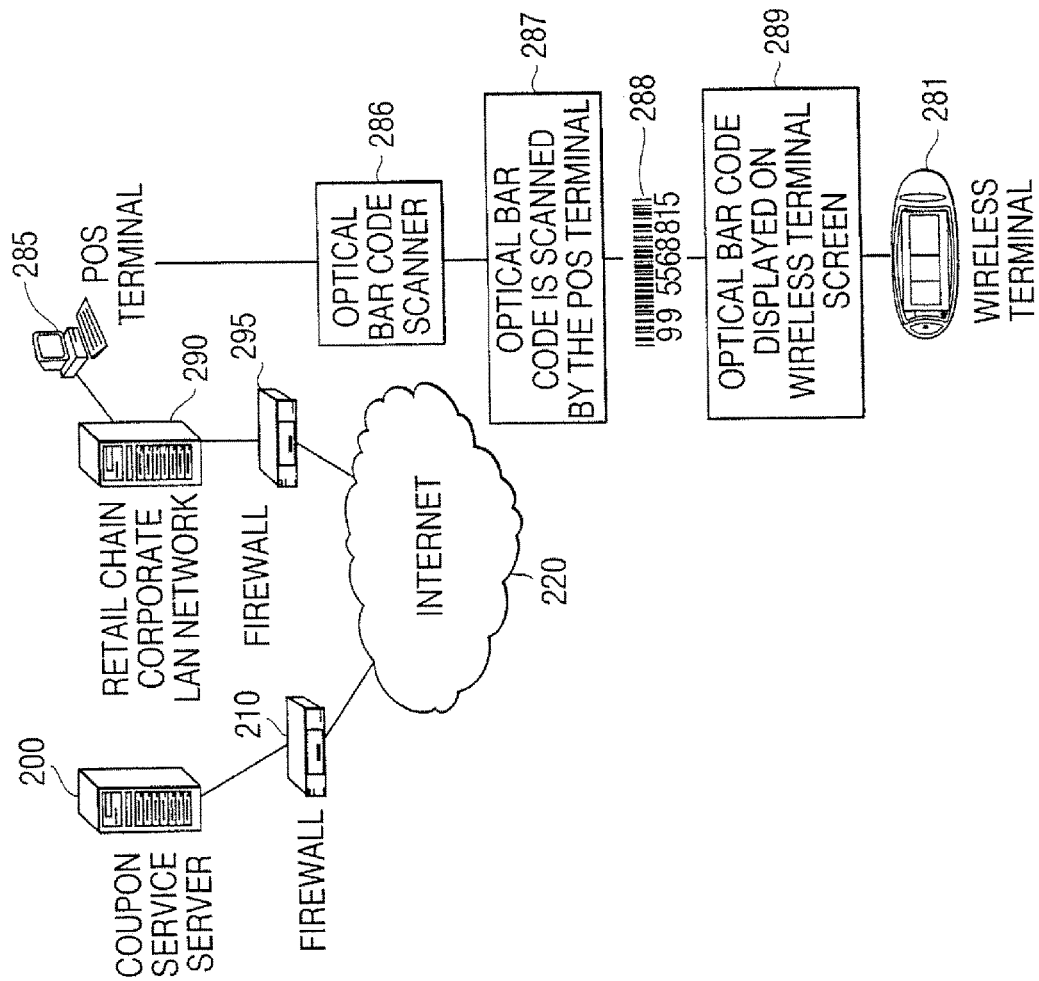
FIG. 5 illustrates the data flow from a wireless terminal to a point of sale terminal via optical bar code scanning.

FIG. 5 illustrates the data flow from a wireless terminal to point-of-sale terminal via optical bar codes.

In operation, the wireless terminal 281 displays an optical bar code 288 containing coupon ID information on the screen of the wireless terminal 281. The point-of-sale terminal operator scans the bar code in Step 287 with the optical bar code scanner 286. The retail chain corporate LAN network 290 receives the information from the point-of-sale terminal 285 and is connected to the coupon service server 200 via the fireball i95, Internet 220, and fireball 210 as with FIG. 4. The remainder of the operation is identical to that of the arrangement of FIG. 4.

Figure 6:
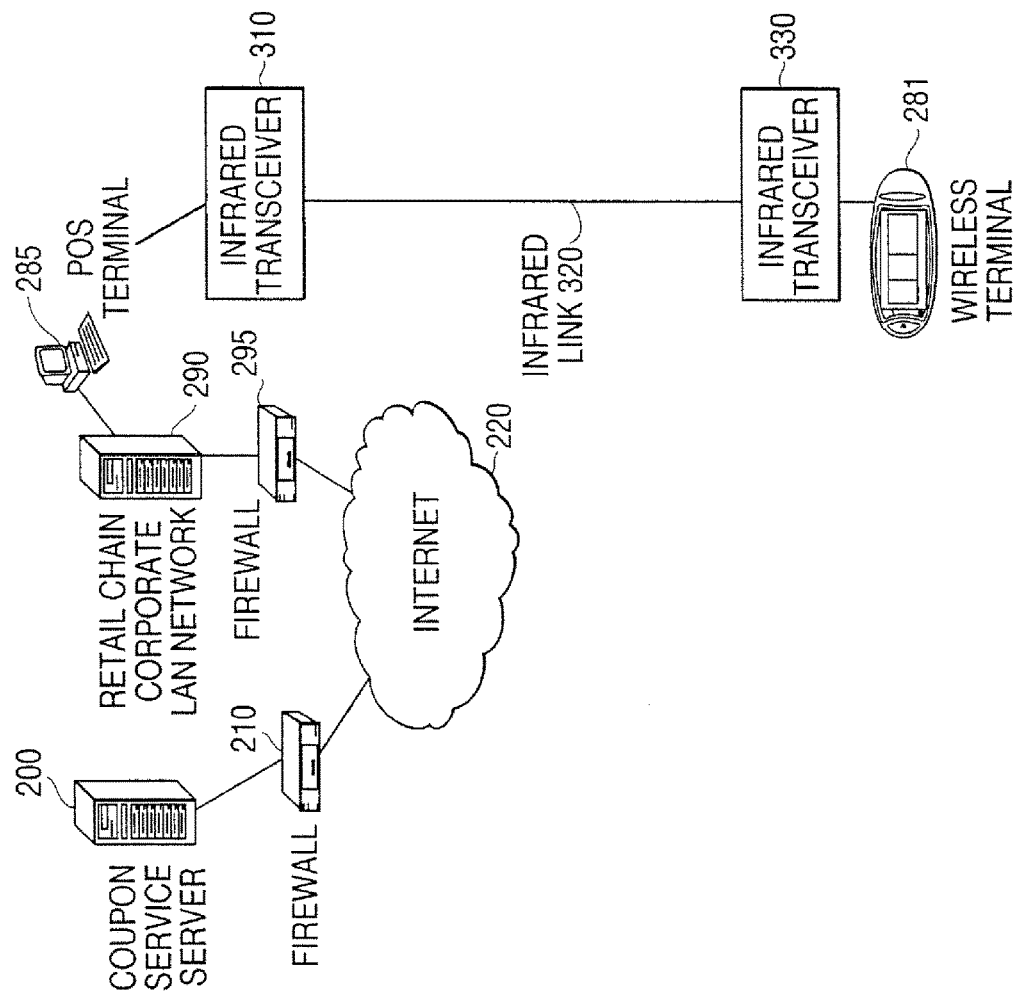
FIG. 6 illustrates the data flow from a wireless terminal to a point of sale terminal via an infrared link.

FIG. 6 illustrates the flow of data from a wireless terminal to a point-of-sale terminal via an infrared link. The operation of the system of FIG. 6 is the same as that of FIG. 4 with the exception that the wireless terminal 281 is connected to the point-of-sale terminal 285 via infrared transceivers 330 and 310 and infrared link 320.

Figure 7:
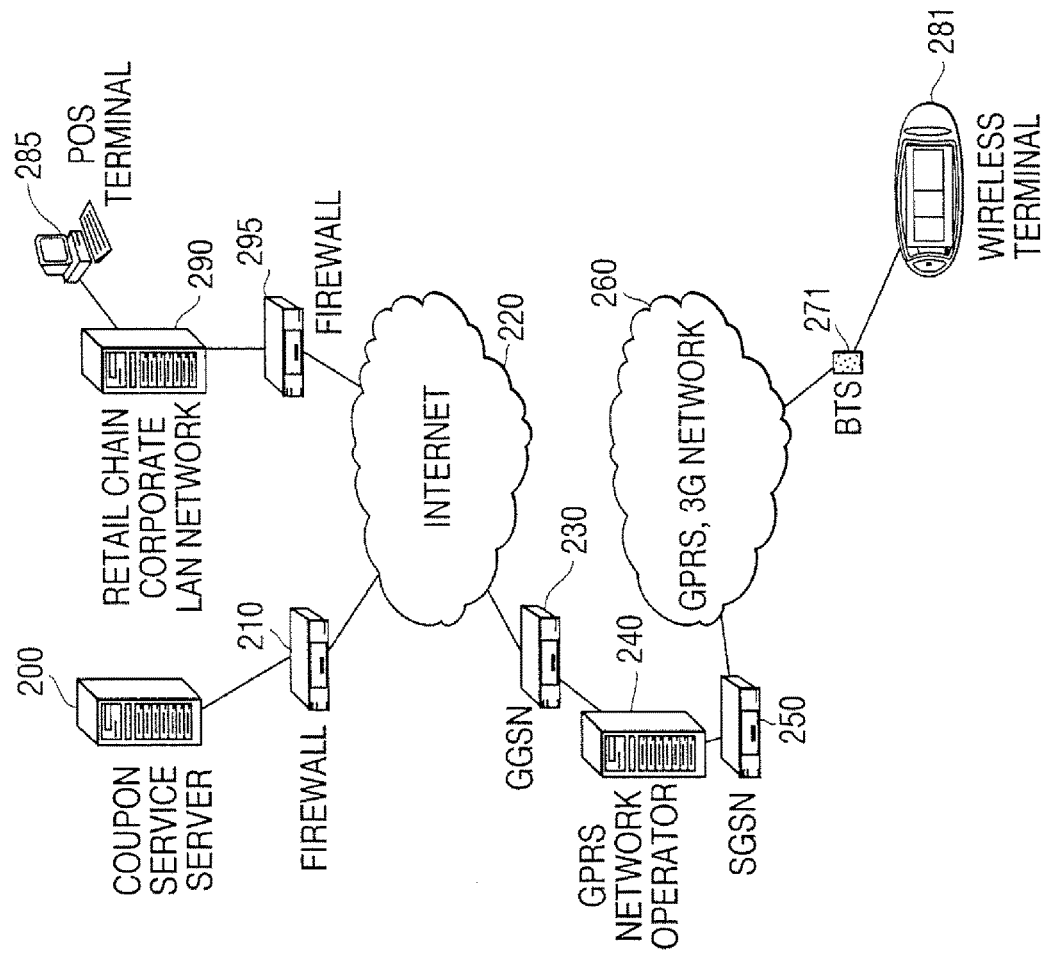
FIG. 7 illustrates the flow from a wireless terminal to a point of sale terminal via GPRS (general packet radio service).

FIG. 7 illustrates the flow of data from a wireless terminal to a point-of-sale terminal via GPRS (general packet radio service).

In this arrangement, the wireless terminal 281 transmits the coupon ID information to the point-of-sale terminal 285 via the BTS 271, GPRS or 3G network 260, SGSN 250, GPRS network operator 240, GGSN 230, Internet 230, firewall 295, and the retail chain corporate LAN 'network 290. The path between the wireless terminal 281 and the Internet 220 may be the same path used to receive the coupon ID information from the coupon service server 200 as noted above with regard to FIG. 3.

The operation of the system illustrated in FIG. 7 is otherwise identical to that of FIG. 4 and accordingly, the details thereof have been omitted for the sake of brevity.

Figure 8:
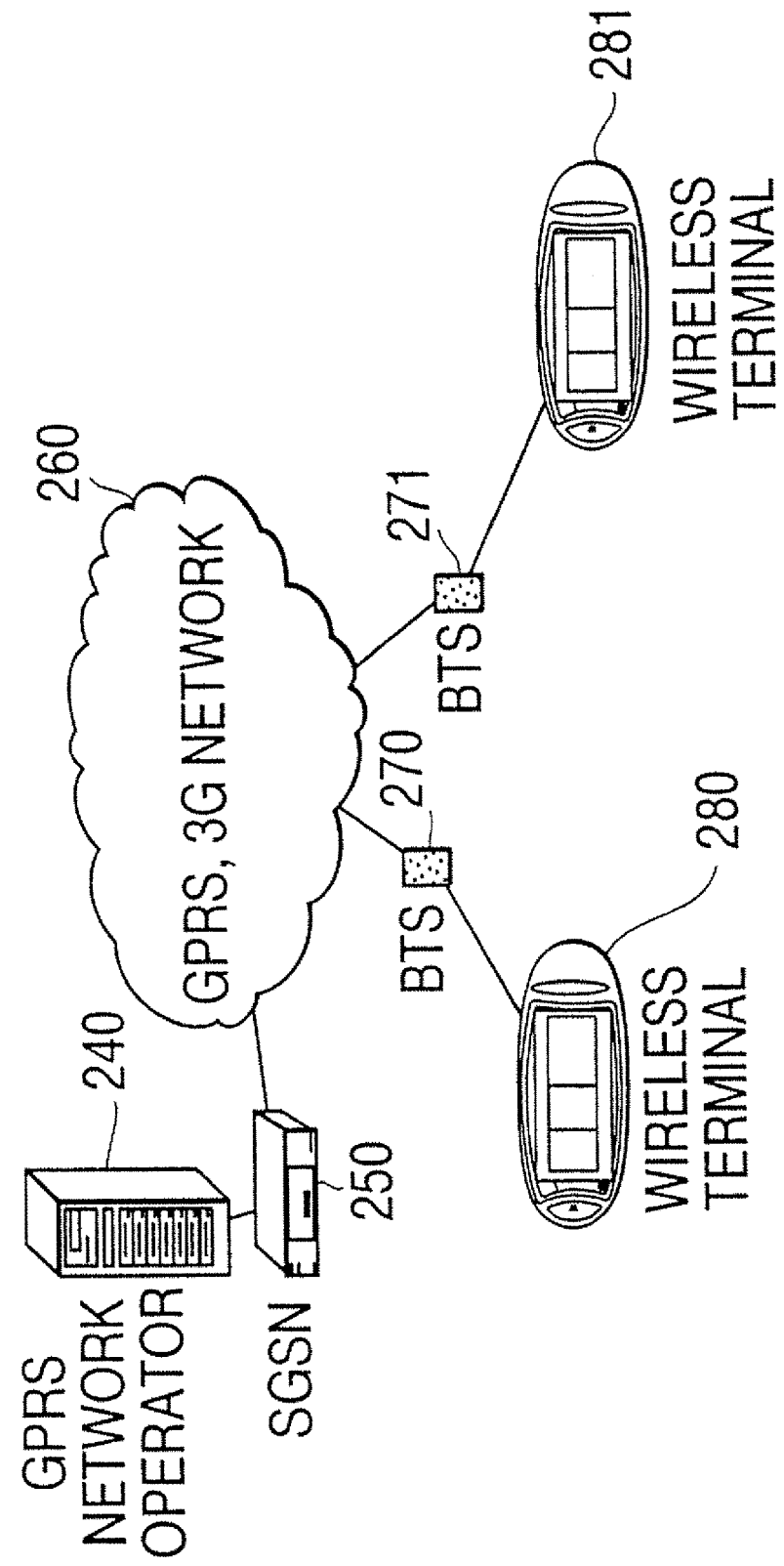
FIG. 8 illustrates the data flow from a wireless terminal to a wireless terminal via GPRS.

FIG. 8 illustrates the flow of data from one wireless terminal to another wireless terminal via GPRS.

As shown in FIG. 8, the wireless terminal 281 may transmit or forward coupon ID data contained therein to wireless terminal 280 via BTS 271, the GPRS or 3G network 260, and the BTS 270. Note that the wireless terminal 281 may have received the coupon ID data from the GPRS network operator 240 via the SGSN 250 and GPRS or 3G network 260 and BTS 271 as previously noted in the discussion of FIG. 3.

The coupons may be transmitted or forwarded to other terminals other than the wireless terminal 280 via the GPRS or 3G network 260.

Figure 9:
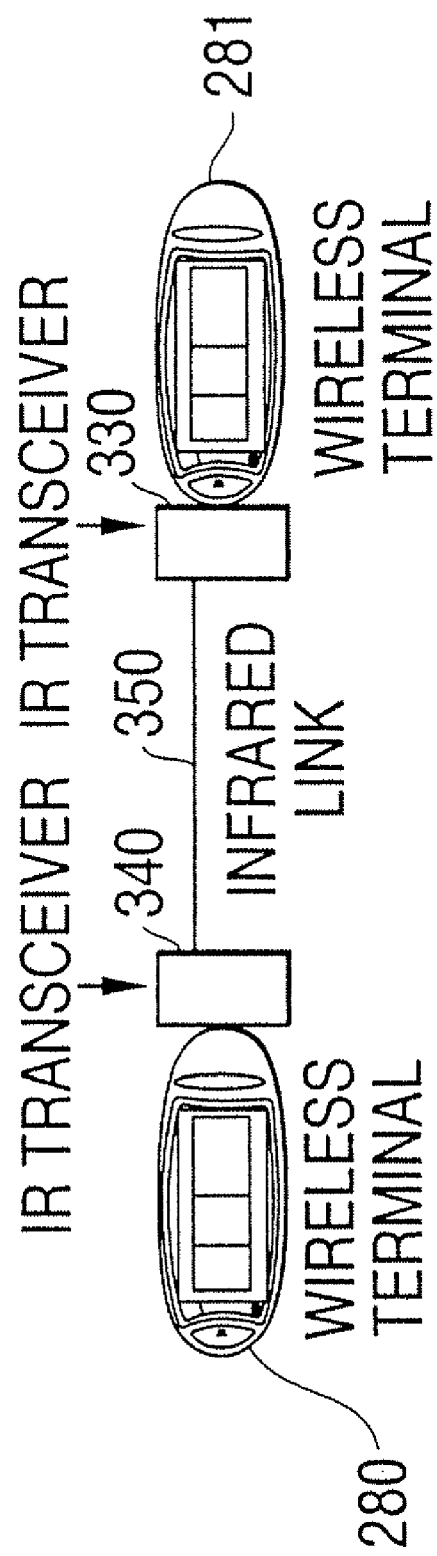
FIG. 9 illustrates the data flow from a wireless terminal to a wireless terminal via an infrared link.

FIG. 9 illustrates the flow of data from one wireless terminal to another wireless terminal via an infrared link.

In this arrangement, wireless terminal 281 is connected to wireless terminal 280 via infrared transceiver 330, infrared link 350 and infrared transceiver 340. The coupon ID and information is transmitted from terminal to terminal via the infrared link 350. The visual/textual representation may be transmitted simultaneously between the wireless terminals via the infrared link or may be downloaded from the coupon service server 200 at a later time.

Figure 10:
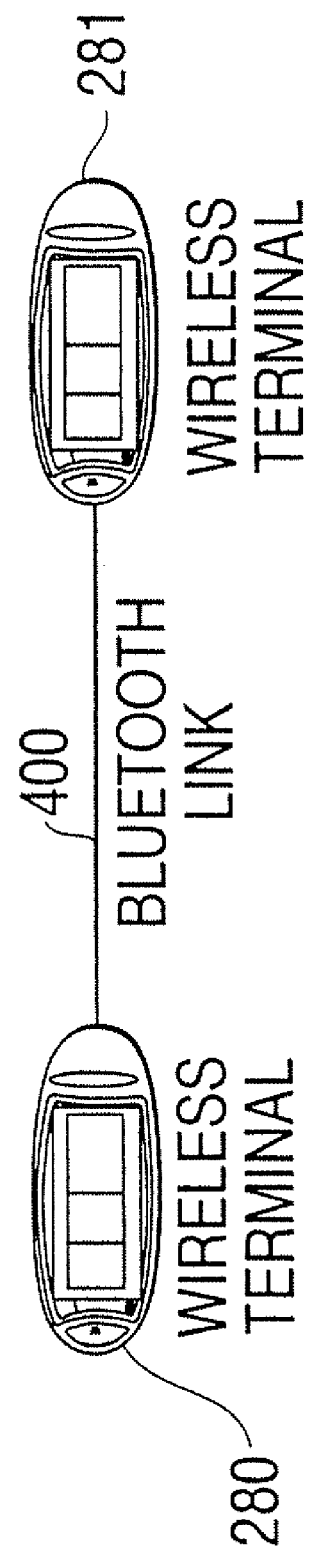
FIG. 10 illustrates the data flow from a wireless terminal to a wireless terminal via Bluetooth.

FIG. 10 illustrates the flow of data from one wireless terminal to another via Bluetooth. The connection between two or more wireless terminals such as 280 and 281 is established via the Bluetooth low-range radio link 400. The coupon ID/information is transmitted from terminal 281 to terminal 280 via the Bluetooth link 400 and the visual/textual representation may be transmitted simultaneously or may be downloaded from the coupon service server 200 at a later time.

Figure 11:
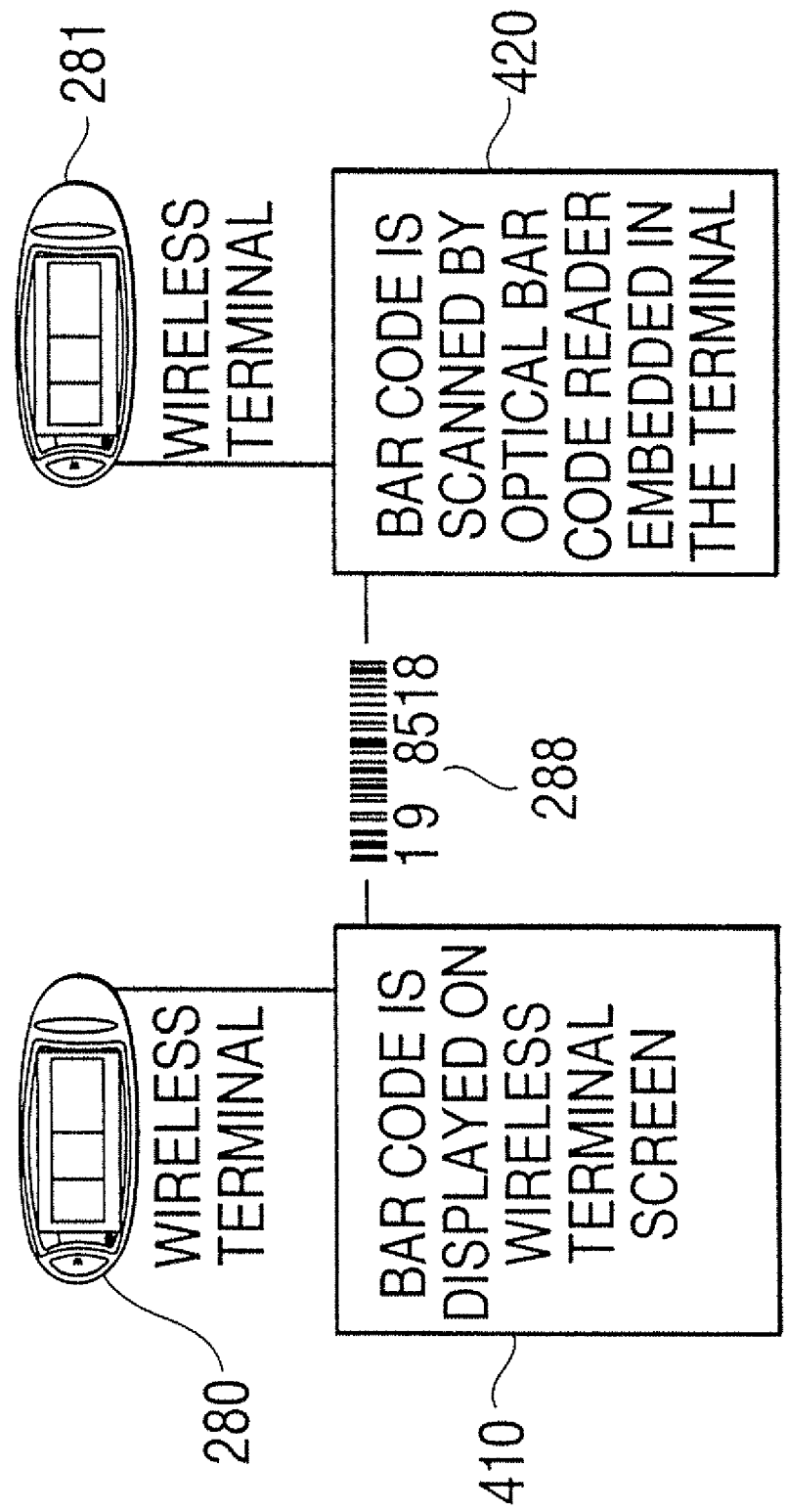
FIG. 11 illustrates the data flow from a wireless terminal to a wireless terminal utilizing optical bar code scanning.

FIG. 11 illustrates the flow of data from one wireless terminal to another wireless terminal utilizing optical bar code scanning. The coupon ID is displayed as a bar code on the screen of wireless terminal 280. An optical bar code scanner 420 imbedded in wireless terminal 281 is used to scan the bar code 288 which is displayed on the wireless terminal screen 410 of wireless terminal 280. Thus, the coupon ID is copied by wireless terminal 281. A network connection via GPRS, for example, may be used to verify the coupon immediately or at a later time period.

Figure 12:
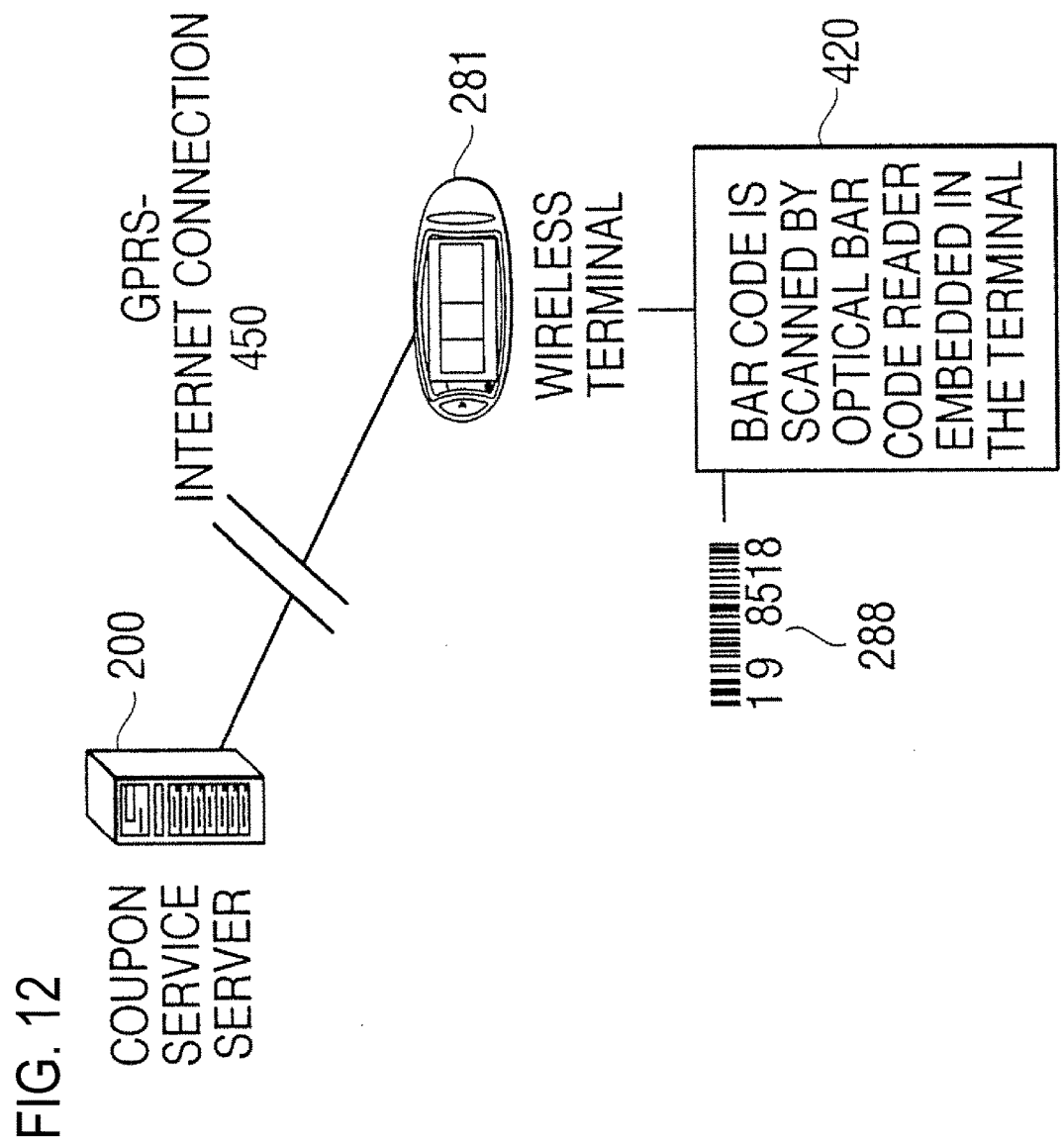
FIG. 12 illustrates optically scanning a coupon ID from a print media source.

FIG. 12 illustrates optically scanning a coupon ID from a print media source using a wireless terminal. Namely, a coupon is printed in a magazine, newspaper, leaflet, etc., the coupon including a coupon ID printed in a bar code format 288. The wireless terminal 281 performs the Step 420 of scanning the printed bar code, having the-coupon ID utilizing an optical bar code reader imbedded in the wireless terminal 281.

Once the coupon ID has been scanned by the wireless terminal 281, it may be stored and/or a visual and textual representation may be downloaded from the coupon service server 200 via the GPRS-Internet connection 450. By this technique, the user of the wireless terminal 281 may also take advantage of printed coupons without having to resort to the inefficient conventional steps used to redeem paper coupons.

Figure 13:
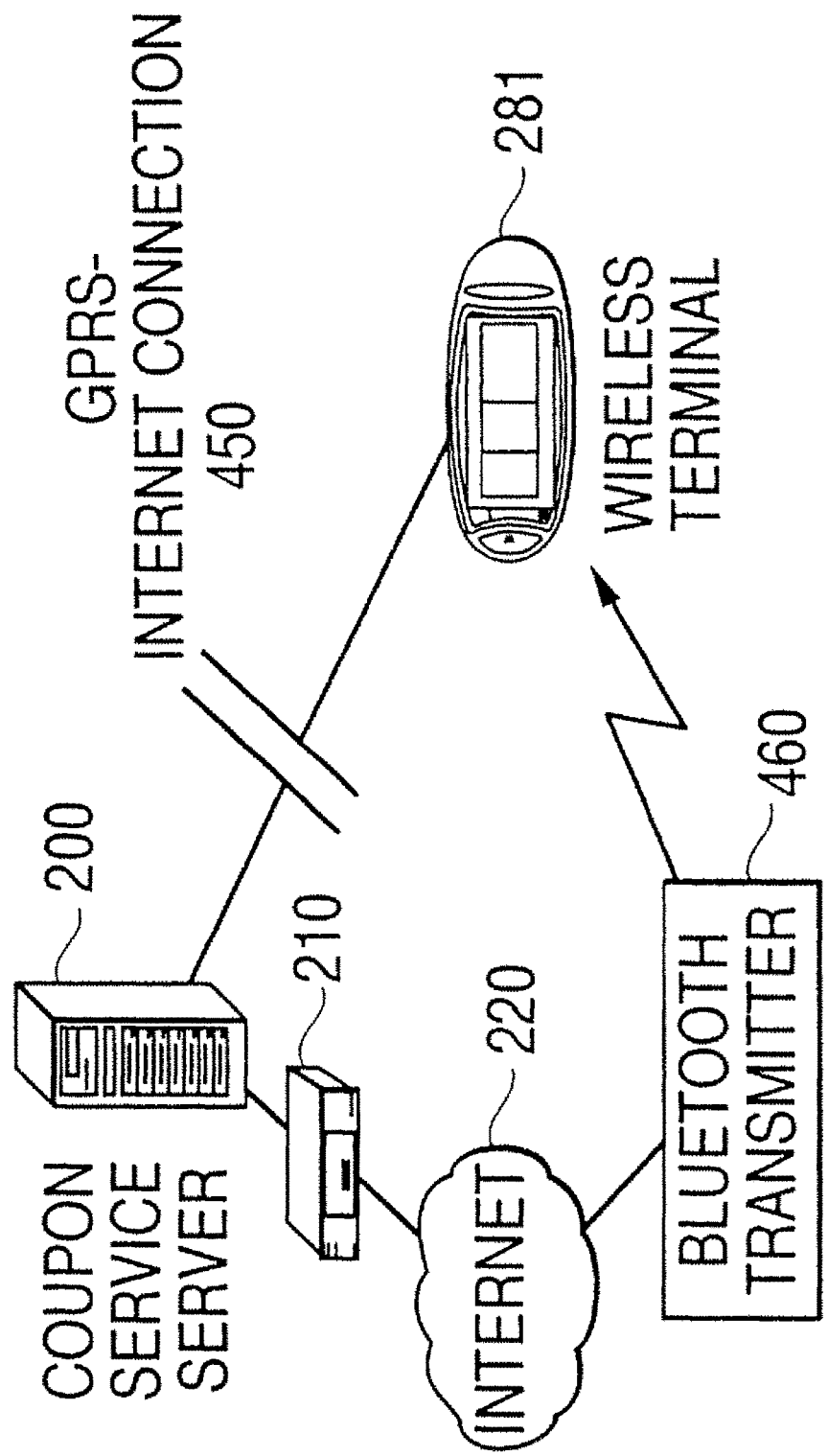
FIG. 13 illustrates a Bluetooth radio link transmitted coupon.

FIG. 13 illustrates the transmission of an electronic coupon utilizing a Bluetooth transmitter.

As the user of the wireless terminal 281 comes in proximity to a physical point of interest where a Bluetooth transmitter used to transmit an electronic coupons resides, the Bluetooth transmitter transmits, coupon IDs or coupon information to the wireless terminal 281. The Bluetooth transmitter 460 receives the coupon IDs or coupon information from the coupon service server 200 via the firewall 210 and Internet 220.

In the case of only coupon IDs being transmitted by the Bluetooth transmitter 460, the coupon visual and textual representation is retrieved by the wireless terminal 281 from the coupon service server 200 via the GPRS-Internet connection 450.

The Bluetooth transmitter 460 can be placed in a retail store, shopping mall, or any location where there is a reasonably large volume of traffic flow, such as an airport or subway station, thereby serving as an advertising medium in conjunction with some sort of visual display related to the electronically transmitted coupons.

Figure 14:
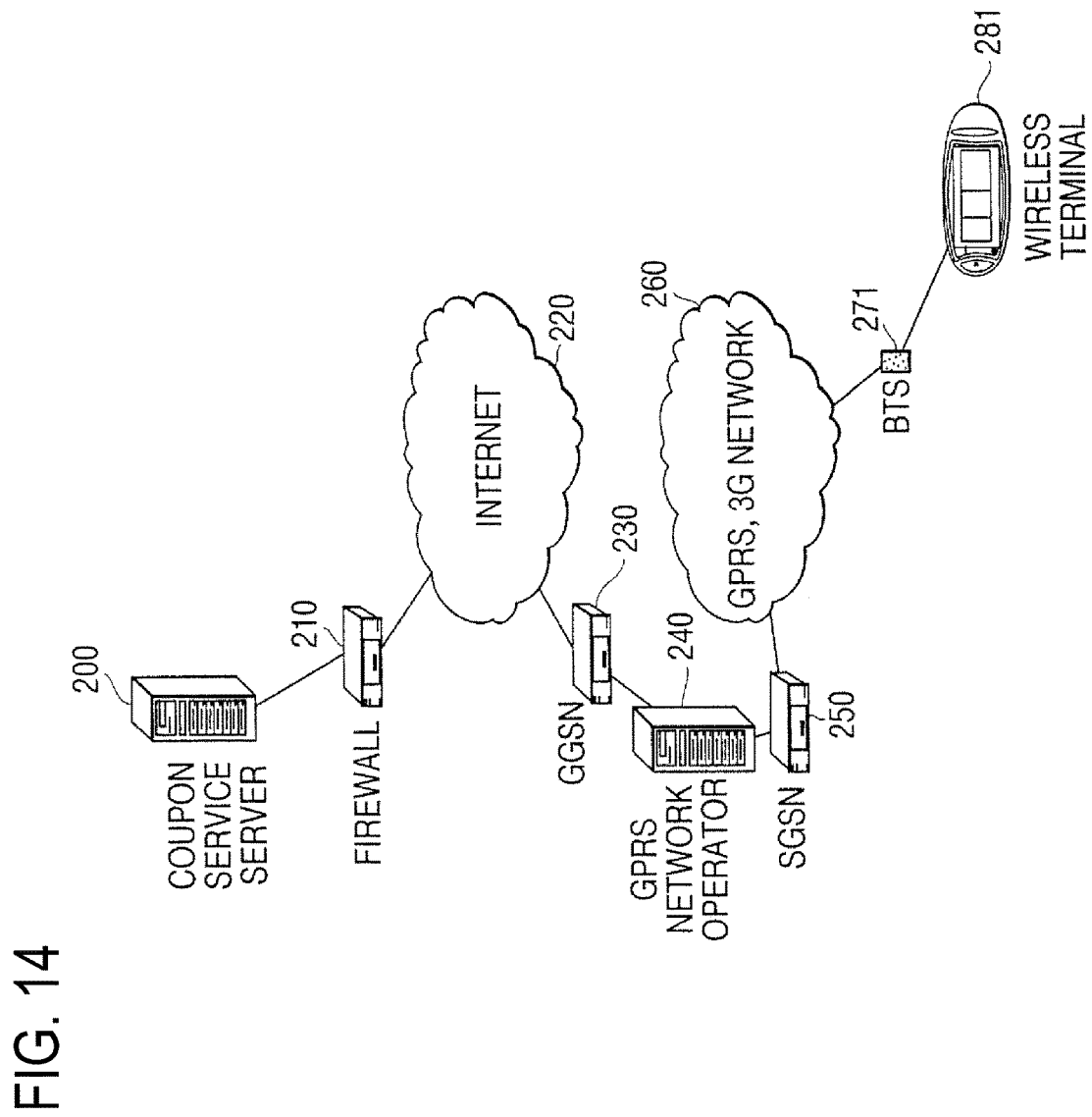
FIG. 14 illustrates a GPRS network transmitted coupon.

FIG. 14 illustrates the transmission of an electronic coupon to a wireless terminal via a GPRS network.

The coupon ID and coupon information, and optionally the visual and textual representation thereof, are delivered to the wireless terminal 281 via the GPRS or 3G network 260 which is connected to the coupon service server 200 via the firewall 210, Internet 220, GGSN 230, GPRS network operator 240, and SGSN 250. The coupon ID and the representation can either be transmitted simultaneously or maybe transmitted at separate times.

This concludes the description of the example embodiments. Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings, and the appended claims without departing from the spirit of the invention. In addition to variations and modifications in the components and/or arrangements, alternative uses will also be apparent to those skilled in the art.

For example, while various electronic transmission elements and methods have been disclosed, the present invention should not be construed as being limited to those disclosed methods and equipment. Although the Internet has been discussed above as a communications path, it is to be understood that the present invention should in no way be construed as being limited thereto. For example, a wireless LAN (Local Area Network) path could also be used.

What is claimed is:

1. An apparatus comprising:
   at least one processor; and
   at least one memory including computer program code for one or more programs,
   the at least one memory and the computer program code configured to, with the at least one processor, cause the apparatus to perform at least the following,
   receive an electronic coupon with coupon information, wherein the coupon information includes forwardability information that allows forwarding of the electronic coupon to one or more wireless mobile terminals;
   store the coupon information in the apparatus;
   display a visual representation of the electronic coupon based, at least in part, on the coupon information;
   wirelessly transfer the coupon information to a point of sale (POS) terminal for validation and redemption based, at least in part, on the transmitted coupon information.

2. The apparatus of claim 1, wherein the reception of the electronic coupon comprises downloading from Internet or messages, scanning from a printed paper, or a combination thereof.

3. The apparatus of claim 2, wherein the electronic coupon is downloaded over a short-range radio link or a wireless LAN connection.

4. The apparatus of claim 1, wherein the electronic coupon is further redeemed based on discount and/or benefit information included in the coupon information.

5. The apparatus of claim 1, wherein the coupon information further includes multiplyability information, a coupon identifier, a validity time period, and a usage time period.

6. The apparatus of claim 5, wherein the visual representation of the electronic coupon comprises a textual representation, a visual representation, an audio representation, or a combination thereof received from a coupon service server based on the coupon identifier.

7. The apparatus of claim 1, further comprising:
   validate the electronic coupon based on a coupon matching sequence; and
   compare the coupon information with one or more promotions effective at the POS terminal.

8. The apparatus of claim 1, wherein the redeeming of the electronic coupon comprises receiving a discount.

9. The apparatus of claim 1, wherein the coupon information is wirelessly transmitted over a short-range radio link.

10. The apparatus of claim 1, wherein the visual representation of the electronic coupon comprises bar code information, and wherein the bar code information is wirelessly transmitted to the POS terminal.

11. A method comprising:
    receiving, by an apparatus, an electronic coupon with coupon information, wherein the coupon information includes forwardability information that allows forwarding of the electronic coupon to one or more wireless mobile terminals;

storing the coupon information in the apparatus;

displaying a visual representation of the electronic coupon based, at least in part, on the coupon information;

wirelessly transferring the coupon information to a point of sale (POS) terminal for validation and redemption based, at least in part, on the transmitted coupon information.

12. The method of claim 11, wherein the reception of the electronic coupon comprises downloading from Internet or messages, scanning from a printed paper, or a combination thereof.

13. The method of claim 12, wherein the electronic coupon is downloaded over a short-range radio link or a wireless LAN connection.

14. The method of claim 11, wherein the electronic coupon is further redeemed based on discount and/or benefit information included in the coupon information.

15. The method of claim 11, wherein the coupon information further includes multiplyability information, a coupon identifier, a validity time period, and a usage time period.

16. The method of claim 15, wherein the visual representation of the electronic coupon comprises a textual representation, a visual representation, an audio representation, or a combination thereof received from a coupon service server based on the coupon identifier.

17. A non-transitory computer-readable storage medium in a mobile device, carrying one or more sequences of one or more instructions which, when executed by one or more processors, cause an apparatus to at least perform the following steps:

receiving an electronic coupon with coupon information, wherein the coupon information includes forwardability information that allows forwarding of the electronic coupon to one or more wireless mobile terminals;

storing the coupon information in the apparatus;

displaying a visual representation of the electronic coupon based, at least in part, on the coupon information;

wirelessly transferring the coupon information to a point of sale (POS) terminal for validation and redemption based, at least in part, on the transmitted coupon information.

18. The non-transitory computer-readable storage medium of claim 17, wherein the reception of the electronic coupon comprises downloading from Internet or messages, scanning from a printed paper, or a combination thereof.

19. The non-transitory computer-readable storage medium of claim 18, wherein the electronic coupon is downloaded over a short-range radio link or a wireless LAN connection.

20. The non-transitory computer-readable storage medium of claim 17, wherein the electronic coupon is further redeemed based on discount and/or benefit information included in the coupon information.

* * * * *